United States Patent
Sarawate et al.

(10) Patent No.: US 9,188,228 B2
(45) Date of Patent: Nov. 17, 2015

(54) LAYERED SEAL FOR TURBOMACHINERY

(75) Inventors: Neelesh Nandkumar Sarawate, Niskayuna, NY (US); Victor John Morgan, Simpsonville, SC (US); David Wayne Weber, Simpsonville, SC (US)

(73) Assignee: General Electric Company, Niskayuna, NY (US)

( * ) Notice: Subject to any disclaimer, the term of this patent is extended or adjusted under 35 U.S.C. 154(b) by 631 days.

(21) Appl. No.: 13/560,357

(22) Filed: Jul. 27, 2012

(65) Prior Publication Data

US 2013/0106066 A1    May 2, 2013

Related U.S. Application Data

(63) Continuation-in-part of application No. 13/281,627, filed on Oct. 26, 2011, and a continuation-in-part of application No. 13/306,090, filed on Nov. 29, 2011.

(51) Int. Cl.
*F16J 15/12* (2006.01)
*F01D 11/00* (2006.01)

(52) U.S. Cl.
CPC ............. *F16J 15/128* (2013.01); *F01D 11/005* (2013.01); *F05D 2240/57* (2013.01)

(58) Field of Classification Search
CPC ....... F01D 11/08; F01D 11/12; F01D 11/127; F01D 9/02; F01D 9/041; F01D 11/005; F16J 15/128; F05D 2250/61; F05D 2240/57
USPC ................ 277/908, 936–939, 644, 650–654; 415/139, 211.2, 173.1, 173.5, 174.5
See application file for complete search history.

(56) References Cited

U.S. PATENT DOCUMENTS 1,823,341 A  *  9/1931  Victor ........................... 428/596
5,088,888 A      2/1992  Bobo
5,154,577 A    10/1992  Kellock et al.
5,221,096 A      6/1993  Heldreth et al.

(Continued)

FOREIGN PATENT DOCUMENTS

DE    102005019250 B3    9/2006
GB         2121123 A   * 12/1983

OTHER PUBLICATIONS

Daniel Kay; "Honeycomb-Brazing Essentials for Successful Use as Turbine Seals," Industrial Heating, Nov. 11, 2003, Simsbury, Conn.

(Continued)

*Primary Examiner* — Edward Look
*Assistant Examiner* — Brian P Wolcott
(74) *Attorney, Agent, or Firm* — John P. Darling

(57) ABSTRACT

The present application provides seal assemblies for reducing leakages between adjacent components of turbomachinery. The seal assemblies may include outer shims, and at least a portion of the outer shims may be substantially impervious. At least one of the outer shims may be configured for sealing engagement with seal slots of the adjacent components. The seal assemblies may also include at least one of an inner shim and a filler layer positioned between the outer shims. The at least one inner shim may be substantially solid and the at least one filler layer may be relatively porous. The seal assemblies may be sufficiently flexible to account for misalignment between the adjacent components, sufficiently stiff to meet assembly requirements, and sufficiently robust to operating meet requirements associated with turbomachinery.

23 Claims, 4 Drawing Sheets

(56) References Cited

U.S. PATENT DOCUMENTS

| | | | |
|---|---|---|---|
| 5,360,219 A * | 11/1994 | Okuda et al. | 277/592 |
| 5,593,278 A | 1/1997 | Jourdain et al. | |
| 5,627,998 A | 5/1997 | Mondrik et al. | |
| 5,868,398 A | 2/1999 | Maier et al. | |
| 5,934,687 A | 8/1999 | Bagepalli et al. | |
| 5,997,247 A | 12/1999 | Arraitz et al. | |
| 6,164,904 A | 12/2000 | Abriles et al. | |
| 6,220,606 B1 | 4/2001 | Kawaguchi et al. | |
| 6,733,234 B2 | 5/2004 | Paptrotna et al. | |
| 6,854,736 B2 | 2/2005 | Paprotna | |
| 6,883,807 B2 | 4/2005 | Smed | |
| 7,097,177 B2 * | 8/2006 | Kasuya | 277/592 |
| 7,334,800 B2 * | 2/2008 | Minnich | 277/644 |
| 7,771,159 B2 * | 8/2010 | Johnson et al. | 415/135 |
| 7,901,186 B2 | 3/2011 | Cornett et al. | |
| 8,028,996 B2 | 10/2011 | Ruggiero et al. | |
| 8,075,255 B2 | 12/2011 | Morgan | |
| 8,210,799 B1 * | 7/2012 | Rawlings | 415/135 |
| 2002/0079654 A1 | 6/2002 | Aksit et al. | |
| 2002/0121744 A1 * | 9/2002 | Aksit et al. | 277/411 |
| 2003/0011145 A1 | 1/2003 | Zhuo et al. | |
| 2009/0085305 A1 | 4/2009 | Demiroglu et al. | |
| 2011/0020113 A1 | 1/2011 | Beeck | |
| 2011/0085888 A1 | 4/2011 | Gouda et al. | |

OTHER PUBLICATIONS

Translation of CN Office Action issued on Feb. 27, 2015 in connection to related CN application 201210417723.2.

* cited by examiner

LAYERED SEAL FOR TURBOMACHINERY

CROSS REFERENCE TO RELATED APPLICATION

This application is a continuation-in-part of both U.S. patent application Ser. No. 13/281,627, entitled "Metallic Stator Seal," filed Oct. 26, 2011, and U.S. patent application Ser. No. 13/306,090, entitled "Shim Seal Assemblies and Assembly Methods for Stationary Components of Rotary Machines," filed Nov. 29, 2011, which are herein incorporated by reference in their entirety.

STATEMENT REGARDING FEDERALLY SPONSORED RESEARCH & DEVELOPMENT

This invention was made with Government support under contract number DE-FC26-05NT42643 awarded by the Department Of Energy. The U.S. Government has certain rights in this invention.

BACKGROUND OF THE INVENTION

The present application relates generally to seals for reducing leakage, and more particularly to shim seals for reducing leakage between adjacent stationary components of turbomachinery.

Leakage of hot combustion gases and/or cooling flows between turbomachinery components generally causes reduced power output and lower efficiency. For example, the hot combustion gases may be contained within a turbine by providing pressurized compressor air around the hot gas path. Typically, leakage of the high pressure cooling flows between adjacent stator components (such as shrouds, nozzles, and diaphragms) into the hot gas path leads to reduced efficiency and requires an increase in burn temperature, and thereby an increase in $NO_x$ (CO produced at low temperature, only occurs at part load), and a decrease in engine gas turbine efficiency to maintain a desired power level as compared to an environment void of such stator-stator leakage. Turbine efficiency thus can be improved by reducing or eliminating stator-stator leakage locations.

Preventing leakage between stator-stator component junctions with seals is complicated by the fact that adjacent stator components have surfaces of different shapes and may expand differently under high temperature conditions causing misalignment between the components. Further, the seals must pass manufacturing, assembly and installation limitations, meet robustness constraints associated with turbomachinery, and withstand the relatively high forces and temperatures produced in turbomachinery.

Currently, turbomachinery typically employ woven metallic cloth based seals between adjacent stator components to limit the leakage of cooling flows therebetween. Such cloth seals often have a porous woven wire mesh cloth layer wrapped around a metal shim with a curved "shepherds hook" on either side. Manufacturing variations, however, involved in creating the "shepherds hook" and in assembling cloth seals result in cloth seals that do not adequately reduce or substantially eliminate the leakage rate between adjacent turbomachinery components, such as a stator-stator junctions. Similarly, some cloth seals may tend to become crimped or otherwise plastically deformed within the space or gap between components during installation or assembly, and thereby perform less effectively than desired.

Accordingly, it would be desirable to reduce or substantially eliminate leakage between turbomachinery components, such between adjacent stator components, by utilizing seals. It is further desirable that such seals are substantially temperature resistant and wear resistant (i.e., long component life), sufficiently flexible so as to provide adequate sealing during use and any misalignment, and meet the manufacturing, assembly, installation and robustness requirements associated with turbomachinery.

SUMMARY OF THE INVENTION

In accordance with one aspect of the present disclosure, a seal assembly for sealing a gap between adjacent turbomachinery components is disclosed. The seal assembly may include a first outer shim and a second outer shim. The first and second outer shim may be operably coupled. At least one of the first and second outer shims may include at least one substantially impervious portion configured to span across the gap and engage each of the adjacent turbomachinery components to substantially seal the gap therebetween.

In some embodiments, each of the first and second outer shims may include at least one substantially impervious portion configured to span across the gap and engage each of the adjacent turbomachinery components to substantially seal the gap.

In some embodiments, the seal assembly may include at least one of an inner shim and a filler layer positioned between the first and second outer shims, and the at least one of an inner shim and a filler layer may be operably coupled to the first and second outer shims. In some such embodiments, the seal assembly may include at least one inner shim, and the at least one inner shim is substantially solid. In some such embodiments, the seal assembly may include at least one filler layer, and wherein the at least one filler layer is as flexible as or less than at least one of the first and second shims. In some other such embodiments, the at least one filler layer may be more porous than at least one of the first and second shims. In some such embodiments, the at least one filler layer may include at least one of a wire mesh woven cloth, a flat ribbon mesh woven cloth, a honeycomb structure, a corrugated shim and a compliant shim. In some other such embodiments, the seal assembly may include at least one inner shim positioned between the at least one filler layer and the first outer shim, and the at least one inner shim is less porous than the at least one filler layer. In some such embodiments, the seal assembly may include a first inner shim adjacent a first filler layer and positioned between the first outer shim and the first filler layer, and a second inner shim adjacent a second filler layer and positioned between the second outer shim and the second filler layer.

In some embodiments, the seal assembly may include at least one inner shim positioned between at least two filler layers, and the at least one inner shim may be adjacent at least one of the at least two filler layers.

In some embodiments, the seal assembly may define a width and a thickness, the first and second outer shims may extend at least along the width of the seal assembly, and the seal assembly may include first and second members operably connected to opposing sides of the first outer shim and extend therefrom at least along the thickness of the seal assembly in a direction towards the interior of the seal assembly. In some such embodiments, the second outer shim and the at least one of an inner shim and a filler layer may be positioned between the first and second members, and the thickness of the first and second members may be greater than the combined thickness of the second outer shim and the at least one of an inner shim and a filler layer.

In some other such embodiments, the seal assembly may include third and fourth members operably connected to opposing sides of the second outer shim that extend therefrom at least along the thickness of the seal assembly towards the interior of the seal assembly. In some such embodiments, at least a portion of the first outer shim may be oriented substantially perpendicular to at least one of the first and second members, and at least a portion of the second outer shim may be oriented substantially perpendicular to at least one of the third and fourth members. In some other such embodiments, at least one of the first and second members may also extend along the width of the seal assembly away from the interior of the seal assembly, and at least one of the third and fourth members may also along the width of the seal assembly away from the interior of the seal assembly. In some such embodiments, the first, second, third and fourth members may also extend along the width of the seal assembly away from the interior of the seal assembly, the first member and the third member may be positioned on a first side of the seal assembly and the second member and the fourth member positioned on a second side of the seal assembly. In some such embodiments, the first and third members may be operably connected to form an apex, and the second and fourth members may be spaced at least along the thickness of the seal assembly. In some such embodiments, at least the first outer shim and the at least one of an inner shim and a filler layer may be operably coupled by at least one weld positioned in a medial portion of the width of the seal assembly. In some such embodiments, at least the second outer shim, first outer shim and the at least one of an inner shim and a filler layer may be operably coupled by at least one weld positioned in a medial portion of the width of the seal assembly.

In some embodiments, wherein the seal assembly defines a width and a thickness, wherein the first and second outer shims extend at least along the width of the seal assembly, wherein the seal assembly includes a first member operably connected to a first width side of the first outer shim and a second member operably connected to a second width side of the second outer shim, and wherein the first and second shims are oriented such that the first side of the first outer shim and the second side of the second outer shim are positioned at opposing width sides of the seal assembly.

In some such embodiments, the first member may extend from the first outer shim at least along the thickness of the seal assembly in a direction towards the interior of the seal assembly and along the width of the seal assembly away from the interior of the seal assembly, and the second member may extend from the second outer shim at least along the thickness of the seal assembly in a direction towards the interior of the seal assembly and along the along the width of the seal assembly away from the interior of the seal assembly. In some such embodiments, the seal assembly may include a third member operably coupled to the first member and a fourth member operably coupled to the second member. In some such embodiments, the third member may extend from the first member at least along the thickness of the seal assembly in a direction towards the second outer shim and along the width of the seal assembly towards the interior of the seal assembly to form a first apex with the first member at a first side of the seal assembly, and the fourth member may extend from the second member at least along the thickness of the seal assembly in a direction towards the first outer shim and along the width of the seal assembly towards the interior of the seal assembly to form a second apex with the first member at a second side of the seal assembly.

In some embodiments, the seal assembly may define a width and thickness, and the first outer shim, the second outer shim and the at least one of an inner shim and a filler layer may be operably coupled by at least one weld or braze extending generally along the thickness of the seal assembly in a medial portion of the width of the seal assembly. In some such embodiments, the seal assembly may include at least first and second woven cloth filler layers, the first and second woven cloth filler layers may be operably coupled to the first and second outer shims by at least two welds, and the at least two welds may include a first weld that directly couples the at least two woven cloth filler layers to one another and a second weld that is weaker than the first weld that directly couples the first outer shim and first woven cloth filler layer and directly couples the second outer shim and second woven cloth filler layer.

In accordance with another aspect of the present disclosure, another seal assembly for sealing a gap between adjacent turbomachinery components is disclosed. The seal assembly may include a first outer shim, a second outer shim, and at least one of an inner shim and a filler layer positioned between the first and second outer shims. The first outer shim, second outer shim and at least one of an inner shim and a filler layer may be operably coupled to another. Further, at least one of the first and second outer shims may include at least one substantially impervious portion configured to span across the gap and engage each of the adjacent turbomachinery components to substantially seal the gap therebetween.

In some embodiments, the seal assembly may include at least one filler layer, and the at least one filler layer may be as flexible as or less flexible than at least one of the first and second shims. In some such embodiments, the seal assembly may include at least one inner shim adjacent at least one of the at least one filler layer, and the at least one inner shim that is adjacent the at least one filler layer may be at least one of less porous than the at least one filler layer and as flexible as or less flexible than at least one of the first and second shims.

In some such embodiments, the seal assembly may define a width and a thickness, and the first and second outer shims may extend at least along the width of the seal assembly. In some such embodiments, at least one the first and second outer shims may include first and second members at opposing width sides thereof that extend therefrom at least along the thickness of the seal assembly in a direction towards the interior of the seal assembly, and the at least one of an inner shim and a filler layer may be positioned between the first and second members.

In accordance with another aspect of the present disclosure, another seal assembly for sealing a gap between adjacent turbomachinery components is disclosed. The seal assembly may include a first outer shim and a second outer shim. The seal assembly may define a width and a thickness, the first and second outer shims may extend at least along the width of the seal assembly, and at least one the first and second outer shims may include first and second members at opposing width sides thereof that extend therefrom at least along the thickness of the seal assembly in a direction towards the interior of the seal assembly. The first and second outer shims may also be operably coupled to another. Further, at least one of the first and second outer shims may include at least one substantially impervious portion configured to span across the gap and engage each of the adjacent turbomachinery components to substantially seal the gap therebetween.

In some embodiments, the seal assembly may further include at least one of an inner shim and a filler layer positioned between the first and second outer shims and the first and second members. In some embodiments, at least the first outer shim, the second outer shim and the at least one of an inner shim and a filler layer may be operably coupled by at least one weld positioned in a medial portion of the width of the seal assembly. In some such embodiments, the filler layer may be more porous and as flexible as or less flexible than at least one of the first and second outer shims, and the inner shim may be as flexible as or less flexible than at least one of the first and second outer shims.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments. Components, aspects, features, configurations, arrangements, uses and the like described, illustrated or otherwise disclosed herein with respect to any particular seal embodiment may similarly be applied to any other seal embodiment disclosed herein.

Figure 1:
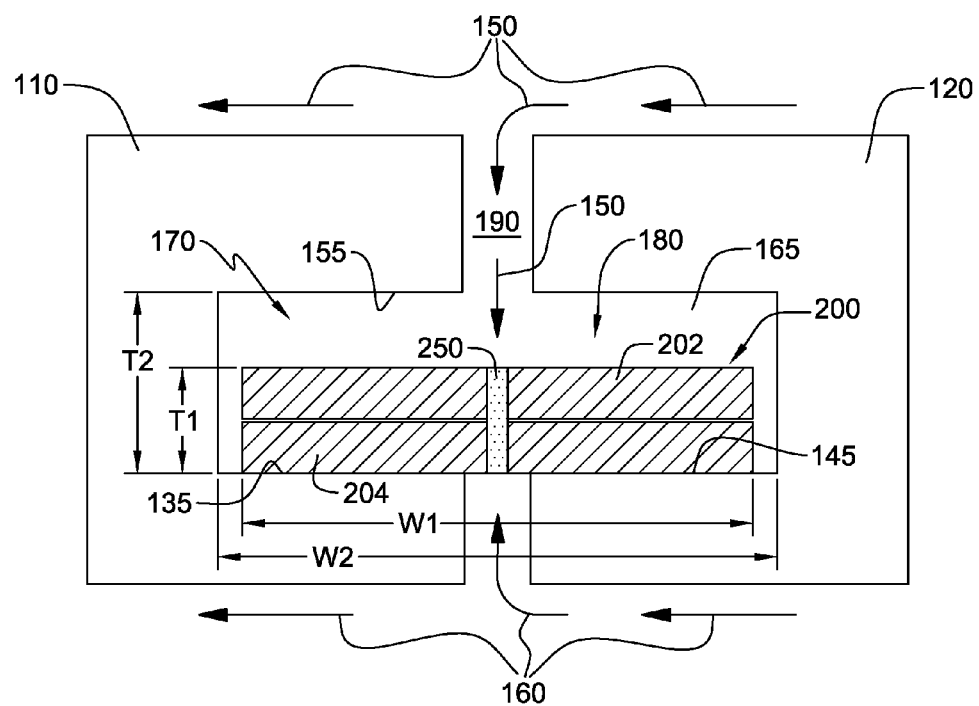
FIG. 1 is a side cross-sectional view of a first exemplary seal assembly in use sealing a pathway between exemplary adjacent components.

FIG. 1 shows a cross-section of a portion of an exemplary turbomachine including an exemplary turbine component 110, an exemplary second component 120 and an exemplary seal 200 installed in the first and second components 110, 120. In the exemplary embodiment shown in FIG. 1, the first and second turbine components 110, 120 may be a first nozzle of a first stator and a second nozzle of a second stator, respectively. In other embodiments, the first and second components 110, 120 may be any other adjacent turbomachinery components. Stated differently, the exemplary seals described herein may be configured for, or used with, any number or type of turbomachinery components requiring a seal to reduce leakage between the components.

The cross-section of the exemplary components 110, 120 and exemplary seal 200 illustrated in FIG. 1 is taken along a width of the structures, thereby illustrating an exemplary width and thickness/height of the structures. It is noted that the relative width, thickness and cross-sectional shape of the structures illustrated in FIG. 1 is exemplary, and the structures may include any other relative width, thickness and cross-sectional shape. Further, the length of the structures (extending in-out of the page of FIG. 1) may be any length, and the shape and configuration of the structures in the length direction may be any shape or configuration.

As shown in FIG. 1, the first and second adjacent components 110, 120 may be spaced from one another such that a gap or pathway 190 extends between the first and second adjacent components 110, 120. Such a gap or pathway 190 may thereby allow flow, such as airflow, between the first and second components 110, 120. In some configurations, the first and second components 110, 120 may be positioned between a first airflow 150, such as a cooling airflow, and a second airflow 160, such as hot combustion airflow. It is noted that the term "airflow" is used herein to describe the movement of any material or composition, or combination of materials or compositions, translating through the gap or pathway 190 between the first and second components 110, 120.

To accept a seal that spans across the gap or pathway 190, and thereby block or otherwise cut off the gap or pathway 190, the first and second adjacent components 110, 120 may each include a slot, as shown in FIG. 1. In the exemplary illustrated embodiment, the first component 110 includes a first seal slot 170 and the second component includes a second seal slot 180. The first and second seal slots 170, 180 may have any size, shape, or configuration capable of accepting a seal therein. For example, as shown in the illustrated exemplary embodiment in FIG. 1, the first and second seal slots 170, 180 may be substantially similar to one another and positioned in a mirrored relationship to define together a net slot or cavity that extends from within the first component 110, across the gap or pathway 190, and into the second component 120. In this manner, the pair of first and second seal slots 170, 180 may jointly form a cavity to support opposing portions of a seal such that the seal 200 passes through the gap or pathway 190 extending between the adjacent components 110, 120.

In some arrangements wherein the first and second components 110, 120 are adjacent, the first and second seal slots 170, 180 may be configured such that they are adjacent and substantially aligned (e.g., in a mirrored or symmetric relationship). However, due to manufacturing and assembly limitations and/or variations, as well as thermal expansion, movement and the like during use, the first and second seal slots 170, 180 may be skewed, twisted, angled or otherwise misaligned. In other scenarios, the first and second seal slots 170, 180 may remain in a mirrored or symmetric relationship, but the relative positioning of the first and second seal slots 170, 180 may change (such as from use, wear or operating conditions). The term "misaligned" is used herein to encompass any scenario wherein seal slots have changed relative positions or orientations as compared to an nominal or initial position or configuration.

With respect to the exemplary first and second seal slots 170, 180 of the exemplary first and second components 110, 120 and the exemplary seal 200 of FIG. 1, in a misaligned configuration (not shown) the exemplary seal 200 must be flexible to account for the misalignment and maintain sealing contact with the first and second seal slots 170, 180 to effectively cut off or eliminate the gap or pathway 190 extending between the first and second components 110, 120 to thereby reduce or prevent the first and second airflows 150, 160 from interacting. More particularly, as shown in FIG. 1 the first and second airflows 150, 260 may interact with the gap or pathway 190 such that the first airflow 150 is a "driving" airflow such that the exemplary seal 200 is forced against first side surfaces 135, 145 of the first and second seal slots 170, 180, respectively. In such scenarios, the seal 200 may be preferably sufficiently flexible to elastically deform as a result of the forces applied by the first airflow 150 (e.g., above that applied by the second airflow 160) to account for any misalignment between the first and second seal slots 170, 180, but sufficiently stiff to resist being "folded" or otherwise "pushed" into the gap or pathway 190. Stated differently, in such a scenario, the exemplary seal 200 may be preferably sufficiently flexible, but yet sufficiently stiff, to maintain sealing engagement with the first side surfaces 135, 145 via the forces of the first airflow 150.

In addition to being sufficiently flexible/stiff (in all directions) to effectively seal the gap or pathway 190 in misalignment scenarios, as described above, the exemplary seal 200 may preferably be sufficiently stiff to satisfy assembly requirements. For example, in one exemplary assembly method the exemplary seal 200 may be initially inserted in the first seal slot 170 of the first component 110, and then the second component 120 moved into an adjacent position with the first component 110 such that the exemplary seal 200 extends into the second seal slot 180 thereof. During such an exemplary assembly method, the exemplary seal 200 may experience "crush forces." Such crush forces may result from the free end of exemplary seal 200 not being aligned with the second seal slot 180 of the second component 120 when the second component 120 is moved into position. In such a situation, an interior face of the second component 120 may contact the free end of the exemplary seal 200 and act to "crush" the exemplary seal 200. To accommodate for such an exemplary assembly error, the exemplary seal 200 may be sufficiently stiff to resist such "crush forces" up to a predefined extent, over which the exemplary seal 200 will "give way" (i.e., become "crushed"). The extend or limit of the ability of the exemplary seal 200 to resist such "crush forces" (the predefined extent") may be chosen or designed such that an assembly operator would be alerted or able to detect when the exemplary seal 200 has been compromised (i.e., "crushed").

As also illustrated in FIG. 1, the thickness T1 of the exemplary seal 200 may be less than the thickness T2 of the first and second seal slots 170, 180, and thereby the thickness T2 of the net slot created by the first and second seal slots 170, 180 when the first and second adjacent components 110, 120 are assembled. In some embodiments, the thickness T1 of the exemplary seal 200 may preferably be within the range of about 25 mm to about 150 mm, and more preferably within the range of about 49 mm to about 130 mm, and even more preferably within the range of about 59 mm to about 120 mm. In alternative embodiments (not shown), the thickness T1 of the exemplary seal 200 before installation may be greater than the thickness T2 of the first and second components 110, 120. In such alternative embodiments (not shown), the exemplary seal 200 may be compressed to fit within the first and second seal slots 170, 180, and thereby may include portions or components configured for such compression. For example, U.S. Pat. No. 6,733,234, U.S. Patent Publication No. 2009/0085305 and U.S. patent application Ser. No. 13/306,090 are directed seals with such "compression fit" features, and are herein incorporated by reference in their entirety.

As shown in FIG. 1, the exemplary seal 200 may be an assembly including a first shim or plate 202 and a second shim or plate 204 coupled to one another. The exemplary first and second shims 202, 204 may be individually, or in combination, effective in substantially preventing the passage of substances therethrough. For example, the first and/or second shims 202, 204 may be substantially solid or otherwise substantially impervious to at least one of gases, liquids and solids at pressures produced in turbomachinery. In one embodiment, the first and/or second shims 202, 204 are substantially solid. In this way, the exemplary first or second shims 202, 204 may sealingly engage sealing surfaces of the first and second seal slots 170, 180 of the first and second components 110, 120 to substantially prevent gases, liquids and/or solids from migrating through the gap 190 between the first and second components 110, 120. In the illustrated embodiment in FIG. 1, for example, the first airflow 150 may force the exemplary second shim 204 against the first side surfaces 135, 145 of the first and second seal slots 170, 180 and, due to the impervious nature of the second shim 204, prevent the airflow from migrating through the gap 190 and into the second airflow 160. In such exemplary embodiments, at least one of the exemplary first and second shims 202, 204 may be made from any material or combination of materials that is substantially impervious to liquids, gases and/or solids at pressures experienced in turbomachinery such that the first and second shims 202, 204, individually or in combination, provide low leakage rates therethrough. For example, the first and second shims 202, 204, individually or in combination, may include leakage rates comparable to solid bar shim seals typically used in turbomachinery. In some embodiments, the first and second shims 202, 204 may be solid metal stock.

In the illustrated embodiment in FIG. 1, the exemplary first shim 202 may be said to have a top position and the exemplary second metal shim 204 a bottom position. The terms "top", "bottom" and "middle," or "interior" are used herein to reflect relative, as opposed to absolute, positions. The use of the first and second shims 202, 204 in both the top and bottom positions allows the exemplary seal assembly 200 to be reversible. For example, in the illustrated exemplary embodiment shown in FIG. 1 the seal assembly 200 may be installed with either the first or second shims 202, 204 adjacent the "sealing" or "load" surface of the first and second seal slots 170, 180 of the first and second components 110, 120 (i.e., the first side surfaces 135, 145 of exemplary first and second components 110, 120, respectively). The use of the first and second shims 202, 204 in both the top and bottom positions also allows the exemplary seal assembly 200 to include a supplemental leakage barrier if the first and second shims 202, 204 are individually (rather than only in combination) effective in providing low leakage rates. For example, in the illustrated exemplary embodiment shown in FIG. 1 the second shim 204 is provided in the bottom "sealing" position and may be substantially impervious such that it provides an effective leakage barrier on its own accord. In such an embodiment, the first shim 202 positioned in the top position 250 may also be substantially impervious such that it can provide an effective leakage barrier on its own accord. Thereby, the first shim 202 may serve as a supplemental leakage barrier in the event that the second shim 204 in the bottom position is becomes compromised or ineffective, such as oxidizing or wearing away. In alternative embodiments however, the first and/or second shims 202, 204 may not be provided, or may not be provided at the top or bottom positions but rather at middle or intermediate positions (as explained further below).

In some embodiments, in addition to being impervious to prevent the passage of substances through the seal 200, the first and second shims 202, 204 may preferably be resistant, or otherwise tolerate, to high temperatures—such as temperatures typically produced within turbomachinery. For example, in some embodiments the first and second exemplary shims 202, 204 may include stainless steel or a nickel based alloy (at least in part), such as nickel molybdenum chromium alloy.

The size of the first and second exemplary shims 202, 204 may be any size. As described above with respect to the exemplary seal assembly 200 itself, the width W1 of the first and second shim 202, 204 may be less than the width W2 of the net slot created by the first and second slots 170, 180 of the first and second components 110, 120, respectively, and the gap 190 between the components 110, 120 when the components 110, 120 are installed adjacent to one another. Similarly, the thickness of T1 and length of the first and second exemplary shims 202, 204 may vary. In some embodiments, at least one of the width W1, thickness T1 and length of the first and second shims 202, 204 is dependent upon, or at least related to, the components 110, 120 in which the exemplary seal 200 is installed and any other components of the exemplary seal 200. In some embodiments that include both the first and second exemplary shims 202, 204, at least one of the widths W1, thicknesses T1 and lengths of the first and second shims 202, 204 differ from each other.

The shape and configuration of the first and second exemplary shims 202, 204 may also vary. In the exemplary illustrated embodiment, the first and second shims 202, 204 are planar with substantially smooth outer surfaces. In some embodiments, at least the shape and configuration of the exterior sealing surface of the first and second shims 202, 204 (e.g., the surface that interacts with the exemplary first side surfaces 135, 145 or other sealing surfaces of the exemplary first and second seal slots 170, 180) may be related to the shape and configuration of the slots 110, 120 in which the first and second shims 202, 204 are installed. For example, in the illustrated example in FIG. 1 the exterior bottom surface of the exemplary second shim 204 may be planar to substantially abut or otherwise substantially contact the substantially planar first side surfaces 135, 145 of the first and second seal slots 170, 180 to effectively prevent or reduce leakage of the first airflow 150 between the seal assembly 200 and the first side surfaces 135, 145 of the first and second seal slots 170, 180 and, thereby, into the second airflow 160. Stated differently, the shape and configuration of the exemplary first and second shims 202, 204, such as the contour of an outer sealing surface thereof, may be configured to ensure sealing engagement with the first and second seal slots 170, 180. In some alternative embodiments (not shown), the shape and configuration of at least one of the first and second shims 202, 204, such as the contour outer sealing surfaces thereof, may be shaped or configured differently that the corresponding sealing surfaces of the first and second seal slots 170, 180 (such as the exemplary first side surfaces 135, 145 of the first and second seal slots 170, 180 illustrated in FIG. 1).

As described above, the exemplary seal 200 may be sufficiently flexible to account for any misalignment expected between stationary first and second turbomachinery components 110, 120 (and therefore the first and second seal slots 170, 180 and any sealing surfaces formed thereby), sufficiently stiff to prevent from being pushed or deformed into the gap 190, sufficiently stiff to meet assembly requirements, and sufficiently robust to meet turbomachinery requirements. As a result, exemplary seal embodiments including the first and second exemplary shims 202, 204, such as exemplary seal 200 illustrated in FIG. 1, may be configured such that the seal assembly 200, as a whole, provides the flexibility, stiffness and robustness described above for use in turbomachinery to account for misalignment and maintain low leakage rates between adjacent components.

The manner in which the first and second shims 202, 204 are coupled to one another may also effect the performance of the seal assembly 200. For example, the manner in which the first and second shims 202, 204 are coupled to one another may effect at least the flexibility of the seal assembly 200 (e.g., with respect to its ability to account for misalignment between the first and second components 110, 120) and the stiffness of the seal assembly 200 (e.g., with respect to its ability to meet for assembly requirements). Similarly, the shape or configuration of the first and second shims 202, 204 may be effected by the attachment mechanism. For example, the attachment mechanism may affect the exterior surface contour or shape of the first and second shims 202, 204. As such, in some exemplary embodiments the seal assembly 200 includes the first and second shims 202, 204 coupled to one another such that the flexibility, stiffness, shape and configuration of the seal assembly 200 are such that the seal assembly 200 maintains low leakage rates and meets installation requirements for turbomachinery components, such as the first and second components 110, 120 shown in FIG. 1. The attachment mechanism may also preferably withstand the robustness limitations associated with turbomachinery (e.g., high temperatures and pressures). In some embodiments, the first and second exemplary shims 202, 204 may be coupled to each other via high temperature adhesives, high strength fasteners, welds, brazes, and other types of known fastening means.

In the exemplary seal assembly 200 shown in FIG. 1, the first and second shims 202, 204 are coupled to one another by an exemplary weld 250 in a medial or central portion of the width of the first and second shims 202, 204. The medial weld 250 may be effective in coupling the first and second shims 202, 204 while maintaining a minimum desired level of flexibility and stiffness of the seal assembly 200. In some such embodiments, the medial weld 250 extends for relatively a short distance along the length of the seal assembly 200 (e.g., a defined spot or point), and a series of such medial welds 250 is provided along the length of the seam assembly 200. In some other such embodiments, the medial weld(s) 250 extends for a relatively long distance along the length of the seal assembly 200 (e.g., a rolling seam weld). In some such seal assembly 200 embodiments, one or more "long" medial weld 250 may be provided. In some alternative embodiments (not shown), the first and second shims 202, 204 may be coupled to one another by multiple, distinct welds that are spaced or staggered at least one of along the width of the seal assembly 200 and the length of the seal assembly 200 (such as with multiple welds that extend for a short distance along the length of the seal assembly 200). For example, the exemplary first and second shims 202, 204 may be coupled to one another by welds that extend for a short distance along the length of the seal assembly 200, and that are staggered along the width and length of the seal assembly 200. In some such embodiments, fewer medial welds may be provided than welds located adjacent the outer sides of the seal assembly 200. In some seal assembly embodiments including the first and second shims 202, 204 welded to one another (such as those discussed above), the welds may be spot welds, laser welds, frictions welds, seam welds or combinations thereof. In some alternative embodiments, the first and second shims 202, 204 may be brazed to one another.

Figure 2:
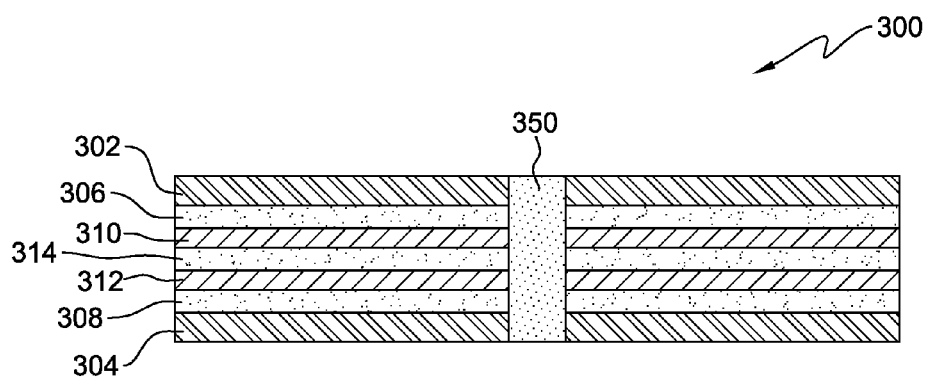
FIG. 2 is a side cross-sectional view of a second exemplary seal assembly.

FIG. 2 shows an exemplary alternative embodiment of a seal assembly generally indicated by reference numeral 300. Exemplary seal assembly 300 is similar to the exemplary seal assembly 200 described above and illustrated in FIG. 1, and therefore like reference numerals preceded by the numeral "3" as opposed to "2" are used to indicate like elements. The description above with respect to exemplary seal assembly 200 equally applies to exemplary seal assembly 300 (and the alternative embodiments of exemplary seal 300 described herein), including description regarding alternative embodiments or other modifications to exemplary seal assembly 200. For example, the exemplary seal assembly 300 (and the alternative embodiments of exemplary seal 300 described herein) may be configured to meet the flexibility, stiffness, and robustness requirements or capabilities that lead to low leakage rates in turbomachinery as described above with respect to exemplary seal 200.

Like exemplary seal assembly 200, exemplary seal assembly 300 may include first and second outer shims 302, 304 in top and bottom positions for sealing engagement with seal slots in adjacent components (not shown). Also like exemplary seal assembly 200, exemplary seal assembly 300 includes an exemplary medial weld 350 as a mechanism for coupling the first and second outer shims 302, 304 to one another.

As discussed above with respect to an alternative embodiment of exemplary seal assembly 200 illustrated in FIG. 1, exemplary seal 300 includes additional layers of components intermediate of the first and second shim 302, 304. As shown in FIG. 2, seal assembly 300 includes exemplary third and fourth shims 306, 308 adjacent the exemplary first and second shims 302, 304, respectively, exemplary first and second filler layers 310, 312 adjacent and interior to the third and fourth shims 306, 308, respectively, and an exemplary fifth shim 314 positioned between the first and second filler layers 310, 312. In the illustrated exemplary embodiment of seal assembly 300, the first exemplary shim 302, exemplary second shim 304, exemplary third shim 306, exemplary fourth shim 308, exemplary first filler layer 310, exemplary second filler layer 312 and exemplary fifth shim 314 are coupled to one another via at least one medially positioned weld 350 that penetrates through all of the components or layers. As described further below, the components or layers of exemplary seal assembly 300 may be coupled to one another by at least one combination or group of attachment mechanisms.

The exemplary third, fourth and fifth shims 306, 308, 314 may or may not be the same or substantially similar shape, size and configuration as the exemplary first and second shims 302, 304. For example, the exemplary third and fourth shims 306, 308 may be the same as the exemplary first and second shims 302, 304, but the exemplary fifth shim 314 may be different in some respect than the first and second shims 302, 304. As another example, at least one of the exemplary third, fourth and fifth shims 306, 308, 314 may be substantially the same size as the first and second shims 302, 304 but for thickness and/or the material properties. In some embodiments including the exemplary third and fourth shims 306, 308, the third and fourth shims 306, 308 may be substantially solid and positioned adjacent the first and second shims 302, 304, respectively. Similarly, in some embodiments including the exemplary fifth shim 314 the fifth shim 314 may be substantially solid and positioned adjacent the exemplary first and second shims 302, 304, respectively. In the illustrated embodiment shown in FIG. 2, the exemplary third, fourth and fifth shims 306, 308, 314 are sheet metal shims.

In some embodiments, the exemplary third, fourth and fifth shims 306, 308, 314 may be effective in providing material to any porous layers included within the seal assembly 300 during welding. For example, if at least one porous layer is provided in the seal assembly 300, such as either of the first and second filler layers 310, 312, material from the third, fourth and fifth shims 306, 308, 314 may partially flow into an adjacent porous layer when heated during a welding process, for example. In this way, the third, fourth and fifth shims 306, 308, 314 may prevent the first and second shims 302, 304 from acting as "donor" material to any porous layer during attachment of the components of the seal assembly 300, and, thereby, prevent the first and second shims 302, 304 from substantially deforming during such an attaching process (e.g., welding). For example, in some exemplary seal assembly 300 embodiments that include at least one porous layer directly adjacent one of the exemplary first and second shims 302, 304, and the exemplary third, fourth and fifth shims 306, 308, 314 (or any other "donor" shim) are not provided, welding the components of the seal assembly 300 together may tend to result in the first and second shims 302, 304 partially flowing into the at least one porous layer and, thereby, the forming of a depression in the outer surface of the first and second shims 302, 304. In such embodiments, since the exterior surface of the first and second shims 302, 304 may act as the sealing surface, as discussed above, a depression in the sealing surface may negatively impact the sealing ability or performance of the seal assembly 300.

In some alternative embodiments of seal assembly 300 (not shown), rather than including a weld or other attachment mechanism that penetrates through all of the components or layers of the seal assembly 300, such as the medial weld 350 illustrated in FIG. 2, the layers or components may be welded in series—some layers or components may be coupled together, and then coupled as a group to one or more remaining layers or components. For example, in some exemplary alternative embodiments the exemplary first and second filler layers 310, 312 and exemplary third, fourth and fifth shims 306, 308, 314 may initially be welded together by one or more relatively strong welds, and then the first and second shims 302, 304 may be welded thereto by one or more relatively mild welds.

In some alternative embodiments of seal assembly 300 (not shown), at least one of the exemplary third, fourth and fifth shims 306, 308, 314 (and any other solid shim) may not be provided. For example, an exemplary seal assembly 300 may include the exemplary third and fourth shims 306, 308 but not the fifth shim 314. As another example, the exemplary seal assembly 300 may include the fifth shim 314 but not the exemplary third and fourth shims 306, 308. Similarly, in some alternative embodiments of seal assembly 300 (not shown) an additional shim layer or component may be provided in addition to the exemplary third, fourth and fifth shims 306, 308, 314.

The exemplary seal assembly 300 may include any number or type of filler shims or layers, and such filler shims or layers may be intermediate of the first and second shims 302, 304, for example. As described above and shown in FIG. 2, the exemplary illustrated seal assembly 300 includes exemplary first and second filler shims or layers 310, 312 immediately intermediate of exemplary second and third shims 306, 308 (and therefore intermediate of exemplary first and second shims 302, 304). In some embodiments, the exemplary filler layers may add robustness thickness to the seal assembly 300 and yet still allow (in combination with the other layers or components of the seal assembly 300) the seal assembly 300 to include adequate flexibility, stiffness, and robustness qualities, as described above, to provide low leakage rates and installation requirements.

The first and second exemplary filler shims or layers 310, 312 may be any material, shape, size and configuration. In some embodiments, the exemplary first and second filler layers 310, 312 may be more porous and/or flexible as compared to other layers or components of the seal assembly 300 (such as the exemplary first, second, third, fourth or fifth shims 302, 304, 306, 308, 314). In some embodiments, the exemplary first and second filler layers 310, 312 may provide a damping feature or capability (i.e., ability to reduce the amplitude of vibration or oscillations of at least a portion of the seal assembly 300) to the seal assembly 300. For example, the first and second filler layers 310, 312 may be layers of metal cloth, such as a wire mesh woven structure, a ribbon mesh woven structure or combinations thereof. As another example, the first and second filler layers 310, 312 may be layers of a relatively low-stiffness material filler structure or structures, such as a honeycomb type structure or metallic foam. As yet another example, the first and second filler layers 310, 312 may be layers of any flexible "spacer" structure, such as corrugated shims, compliant shims, hollow shims and combinations thereof.

In some alternative embodiments of seal assembly 300 (not shown), additional filler shims or layers may be provided in addition to the exemplary first and second filler shims or layers 310, 312. In some other alternative embodiments of seal assembly 300 (not shown), only one of the first and second filler shims or layers 310, 312 may be provided. In yet another alternative embodiment (not shown), the exemplary third, fourth and fifth shims 306, 308, 314 (and any other solid shim besides the first and second shims 302, 304) may not be provided, and thereby the seal assembly 300 may only include at least one of the first and second filler shims or layers 310, 312 intermediate of the first and second shims 302, 304. Similarly, in some alternative embodiments the positioning of filler shim or layer, such as the first and second filler shims or layers 310, 312, may differ from that illustrated in seal assembly 300 of FIG. 2. For example, one or more filler shim or layer may be immediately adjacent the first and second shims 302, 304.

Figure 3:
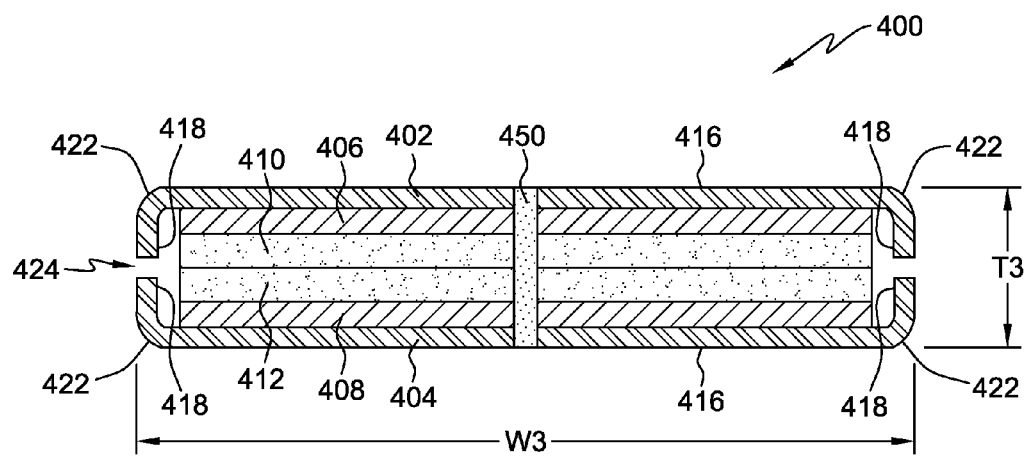
FIG. 3 is a side cross-sectional view of a third exemplary seal assembly.

FIG. 3 shows an exemplary alternative embodiment of a seal assembly generally indicated by reference numeral 400. Exemplary seal assembly 400 is similar to the exemplary seal assembly 200 described above and illustrated in FIG. 1 and seal assembly 300 described above and illustrated in FIG. 2, and therefore like reference numerals preceded by the numeral "4", as opposed to "2" or "3", are used to indicate like elements. The description above with respect to exemplary seal assembly 200 exemplary seal assembly 300 equally applies to exemplary seal assembly 400 (and the alternative embodiments of exemplary seal assembly 400 described herein), including description regarding alternative embodiments (i.e., modifications, variations or the like) to exemplary seal assemblies 200 and 300. For example, the exemplary seal assembly 400 (and any alternative embodiments of exemplary seal 400 described herein) may be configured to meet the flexibility, stiffness and robustness requirements or capabilities described above with respect to exemplary seal 200 and 300.

Like exemplary seal assembly 200 of FIG. 1 and exemplary seal assembly 300 of FIG. 2, exemplary seal assembly 400 includes exemplary first and second outer shims 402, 404 in top and bottom positions for sealing engagement with seal slots in adjacent components (not shown). Further, exemplary seal assembly 400 includes exemplary second and third shims 406, 408 immediately intermediate (i.e., adjacent on the interior sides) of the first and second outer shims 402, 404, respectively, and exemplary first and second filler shims or layers 410, 412 immediately intermediate of the second and third shims 406, 406, respectively. Still further, like exemplary seal assembly 200 and exemplary seal assembly 300, exemplary seal assembly 400 includes at least one exemplary medial weld 450 as a mechanism for coupling the shims and layers to one another.

It is noted that although exemplary seal assembly 400 is illustrated in FIG. 3 as including exemplary first and second filler shims or layers 410, 412 and exemplary second and third shims or layers 406, 406, exemplary seal assembly 400 may alternatively include any number of layers or shims of any number of differing shim types or configurations (as discussed above with respect to exemplary seal apparatus 200 and 300). For example, in addition to the exemplary first and second shims or layers 402, 404, exemplary seal assembly 400 may include only one or more filler layer, only one or more additional substantially solid or "donor" shims, only one or more other type of layer or shim, or any combination of filler shims, solid shims and other types of shims.

As shown in FIG. 3, exemplary seal assembly 400 differs from exemplary seal assemblies 200 and 300 in the shape or configuration of the exemplary first and second exterior shims or layers 402, 404. Specifically, the exemplary first and second outer or exterior shims or layers 402, 404 include portions that extend along the thickness T3 at the sides of the seal assembly 400 towards the interior of the seal assembly 400. As shown in FIG. 3, the exemplary first and second shims 402, 404 may include an exemplary first portion 416 extending along the width W3 of the seal assembly 400 and an exemplary second portion 418 extending along the thickness T3 of the seal assembly 400 towards the interior of the assembly 400. The exemplary first portion 416 and second portion 418 may be integral with the exemplary first and second shims. For example, the exemplary first and second shims or layers 402, 404 may be comprised of a single piece of material and the first and second portions 416, 418 may be formed by deforming the material. In other embodiments, the first and second portions 416, 418 may be distinct members coupled to one another. As illustrated in FIG. 3, the transition or joint 422 between the first and second portions 416, 418 may include a rounded exterior corner of a small radius. In such a configuration, since the transition or joint 422 between the first and second portions 416, 418 may form the exterior corners 422 of the seal assembly 400, the radiused profile of the exterior corners 422 of the seal assembly 400 may be advantageous, for example, in regards to assembly.

As illustrated in FIG. 3, the exemplary second portions 418 of the exemplary first and second shims 402, 404 may be substantially planar and oriented substantially normal to the respective exemplary first portion 416, which may also be substantially planar. In alternative embodiments, the first and second portions 416, 418 may not be planar, and the second portions 418 may be oriented with respect to their respective first portion 418 at orientations other than about 90 degrees. In some embodiments the lengths of the second portions 418 may be substantially the same, and in other embodiments the lengths of the second portions 418 may vary. Further, the widths of the exemplary first portions 416 of the exemplary first and second shims 402, 404, and therefore the width positions of the exemplary second portions 418 of the exemplary first and second shims 402, 404, may vary or be identical. For example, the corresponding pairs of the exemplary second portions 418 of the exemplary first and second shims 402, 404 may be aligned, slightly shifted or juxtaposed with each other.

As also shown in FIG. 3, the first and second shims or layers 402, 404 may be configured such that a gap 424 is provided between the interior ends of the second portions 418 of the first and second shims 402, 404 in a natural or neutral state of the seal assembly 400 (when the seal assembly 400 is not subjected to a load). The exemplary gap 424 provided between the interior ends of the second portions 418 may allow the seal assembly 400 to compress or otherwise flex (such as compression/flexibility provided by any filler layer). In some embodiments, the exemplary gap 424 may be between about 0.001 inch and 0.05 inch measured in the direction of the thickness or height T3 of the seal assembly, where the seal assembly is in a neutral (i.e., non-deformed) state. Similarly, the seal assembly 400 may be configured such that the assembly second portions 418 of the first and second shims 402, 404 are spaced from any interior shims or layers in the direction along the width W3 of the seal assembly 400 (such as from the second and third interior shims or layers 406, 408 and the filler shims or layers 410, 412). In such a configuration, the interior space along the width W3 of the seal assembly 400 may prevent the second portions 418 from rubbing against any interior layers or shims when the seal assembly 400 is compressed (or expanded) along its thickness T3. In alternative embodiments (not shown), the second portions 418 of the first and second shims 402, 404 may be in abutment with, or compressed against, the sides of one or more interior shims in the direction along the width W3 of the seal assembly 400 (such as in abutment with, or compressed against, the sides of the second and third interior shims or layers 406, 408 and, potentially, the filler shims or layers 410, 412). Thereby, in such embodiments, the second portions 418 may advantageously provide a mechanism for aligning one or more interior shims or layers with the first and second shims 402, 404 during assembly of the seal assembly 400 (and potentially maintain alignment of the with the first and second shims 402, 404 with the interior shims or layers after the seal assembly 400 is assembled).

The interior-extending assembly second portions 418 of the seal assembly 400 may provide several advantages. As another example, the interior-extending orientation of the second portions 418 may cover and thereby protect at least a portion of any interior shims or layers of the seal assembly 400. For example, in exemplary seal assembly embodiments including filler layers or shims (such as first and second filler layers 410, 412) including a cloth, the second portions 418 may wrap at least partially along the sides of the cloth and thereby prevent the cloth from damage, such by preventing the end portions of the cloth from bending fraying. Further, the configuration of the first and second shims 402, 404 (i.e., first and second portions 416, 418) may be relatively easy to manufacture and assemble with other components of the seal assembly 400. As yet another example, the interior-extending second portions 418 (such as at about 90 degrees) may act to increase the strength or robustness of the seal assembly 400 in at least one direction, such as a direction extending along the width W3 of the seal assembly 400 or a direction extending along the length of the seal assembly 400. As discussed above with respect to exemplary seal assembly 200, strength (i.e., stiffness) may be advantageous during use and/or assembly.

Figure 4:
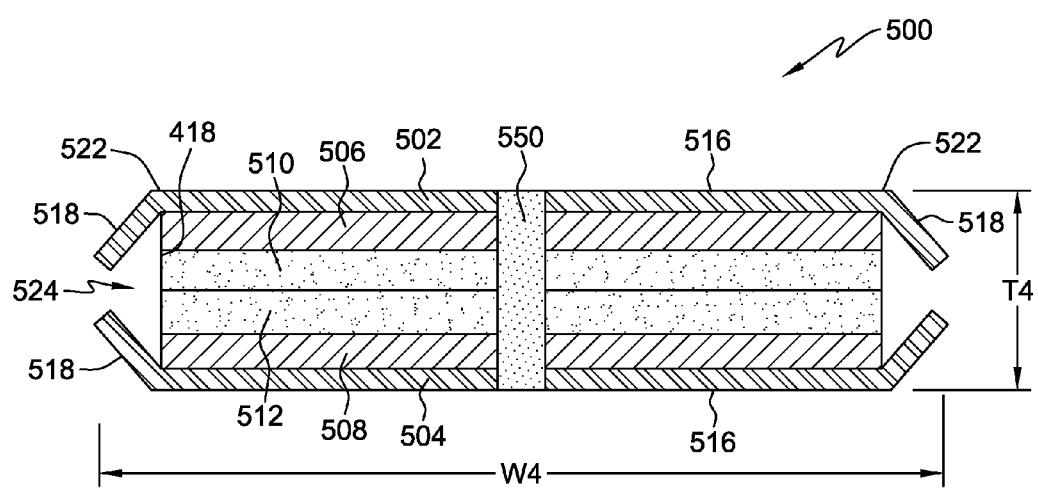
FIG. 4 is a side cross-sectional view of a fourth exemplary seal assembly.

FIG. 4 shows an exemplary alternative embodiment of a seal assembly generally indicated by reference numeral 500. Exemplary seal assembly 500 is substantially similar to the exemplary seal assembly 400 described above and illustrated in FIG. 3, and therefore like reference numerals preceded by the numeral "5", as opposed to "4", are used to indicate like elements. The description above with respect to exemplary seal assembly 400 (including the description imported from the description regarding exemplary seal assembly 200 and exemplary seal assembly 300), including description regarding alternative embodiments (i.e., modifications, variations or the like), equally applies to exemplary seal assembly 500 (and any alternative embodiments of exemplary seal 500).

One difference between exemplary seal assembly 500 of FIG. 4 and exemplary seal assembly 400 of FIG. 3 is the orientation of the exemplary second portions 518 of the exemplary first and second shims or layers 502, 504 with respect to the respective exemplary first portions 516 thereof and the other components of the seal assembly 500. As shown in FIG. 4, the exemplary second portions 518 of the exemplary first and second shims 502, 504 extend both internally towards the interior of the seal assembly 500 in the thickness or height direction T4 and externally away from the interior of the seal assembly 500 in the width direction W4. In one such embodiment, the second portions 518 may be oriented at about 45 degrees from the corresponding first portion 516 measured from the interior of the seal assembly 500.

The angled orientation of the second portions 518 of the exemplary seal assembly 500 may provide several advantages. For example, the angled orientation of the second portions 518 of the seal assembly 500 may act to self-align the exemplary seal assembly 500 with a seal slot (such as the seal slots 170, 180 discussed above with respect to FIG. 1) during assembly. More specifically, if the exemplary seal assembly 500 is being inserted into a seal slot of a component and the seal assembly 500 and the seal slot are misaligned, an exemplary second portion 518 of the exemplary first or second shims 502, 504 may contact the leading edge of the seal slot. Once a second portion 518 of the first or second shims 502, 504 contacts of a leading edge of a seal slot, further movement of the seal slot (i.e., the component forming the seal slot) and the seal assembly 500 towards one another will cause the exemplary second portion 518 to slide or "ride" along the leading edge of the seal slot until the corresponding first portion 516 of the exemplary first or second shim 502, 504 passes over the leading edge and enters the seal slot (i.e., until the seal assembly 500 and the seal slot are at least minimally "aligned"). Further, the configuration of the exemplary first and second shims 402, 404 (i.e., the exemplary first and second portions 516, 518) may be relatively easy to manufacture and assemble with the other components of the seal assembly 400. Still further, the exemplary angled orientation of the second portions 518 of the seal assembly 500 may increase the strength or robustness of the seal assembly) 500 in a direction extending along the width W3 of the seal assembly 500 (at least compared to an exemplary seal assembly without such angled orientation of the second portions 518).

Figure 5:
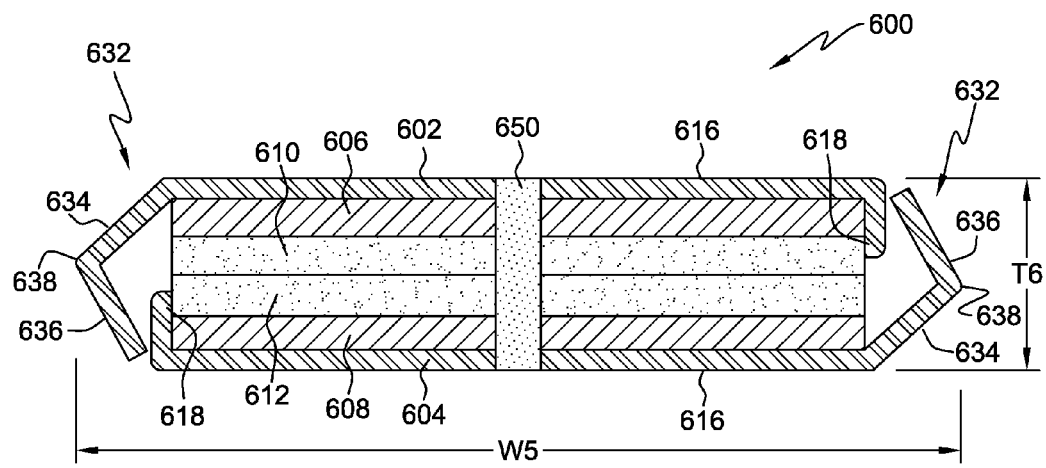
FIG. 5 is a side cross-sectional view of a fifth exemplary seal assembly.

FIG. 5 shows an exemplary alternative embodiment of a seal assembly generally indicated by reference numeral 600. Exemplary seal assembly 600 is similar to the exemplary seal assembly 500 described above and illustrated in FIG. 4, and therefore like reference numerals preceded by the numeral "6", as opposed to "5", are used to indicate like elements. The description above with respect to exemplary seal assembly 500 (including the description imported from the description regarding exemplary seal assemblies 200, 300 and 400), including description regarding alternative embodiments (i.e., modifications, variations or the like), equally applies to exemplary seal assembly 600 (and any alternative embodiments of exemplary seal 600).

One aspect that exemplary seal 600 differs from exemplary seal assembly 500 is the configuration of the exemplary first or second shims 602, 604. As shown in FIG. 5, the exemplary first and second shims or layers 602, 604 of exemplary seal assembly 600 are substantially identical, but their orientation is reversed in both the thickness T6 and width W5 directions. Each of the exemplary first and second shims or layers 602, 604 includes an exemplary first portion 616, an exemplary centering portion 632 extending from a first end thereof and an exemplary second portion 618 extending from the opposing end thereof, as illustrated in FIG. 5. The centering portion 632 may include an exemplary first centering member 634 extending from the first portion 616 such that it extends towards the interior of the seal assembly 600 in the direction of the thickness T6 of the seal assembly 600 and away from the medial portion of the seal assembly 600 in the direction of the width W5 of the seal assembly 600, as shown in FIG. 5. Similarly, as also shown in FIG. 5, the centering portion 632 may include an exemplary second centering member 636 extending from the first centering member 634 such that it extends in the same direction in the direction of the thickness T6 of the seal assembly 600 as the exemplary first centering portion 632, but towards the medial portion of the seal assembly 600 in the direction of the width W5 of the seal assembly 600.

Due to the orientation of the exemplary first and second centering members 634, 636 as described above, the exemplary first and second centering members 634, 636 may generally form a "<" or ">" shape (i.e., the shape of a "less than" or "greater than" sign) depending upon which side of the seal assembly 600 in the width W5 direction the centering portion 632 is positioned. Stated differently, the exemplary first and second centering members 634, 636 of the exemplary centering portion 632 from an exemplary apex or point 639 that defines one of the two sides of the seal assembly 600 in the width W5 direction (depending upon which side of the seal assembly in the width W5 direction the exemplary centering portion 632 is positioned). In the illustrated exemplary embodiment, the first and second centering members 634, 636 are configured such that the apex 639 of the centering portion 632 is positioned in a medial location of the thickness T6 of the seal assembly 600 when the seal assembly 600 is in a natural undeformed state.

The orientation of the exemplary first and second centering members 634, 636 of the exemplary centering portion 632, as described above, is substantially similar to the orientation of the exemplary second portions 518 of the exemplary first and second shims 502, 504 of the exemplary illustrated seal assembly 500 of FIG. 4. Therefore, the exemplary first and second centering members 634, 636 may advantageously act in substantially the same way as the exemplary second portions 518, as described in detail above with respect to exemplary illustrated seal assembly 500, to self-center or align the seal exemplary assembly 600 when being inserted into seal slots. Similarly, the configuration and orientation of the exemplary second portion 618 of each of the exemplary first and second shims or layers 602, 604 may be substantially similar to that described above with respect to that of the exemplary second portions 418 of the exemplary first and second shims 402, 404 of the exemplary seal assembly 400 of FIG. 3. Therefore, the exemplary second portion 618 of the second shims or layers 602, 604 may advantageously act in substantially the same way as the exemplary second portions 418, as described in detail above with respect to seal assembly 400, to increase the strength or robustness of the exemplary seal assembly 600 in a direction extending along the width W6 of the seal assembly 600, protect the ends of one or more internal or shim or filler layer, and provide a mechanism for aligning one or more interior shims or layers with the first and second shims 602, 604 during assembly (and potentially after assembly).

Figure 6:
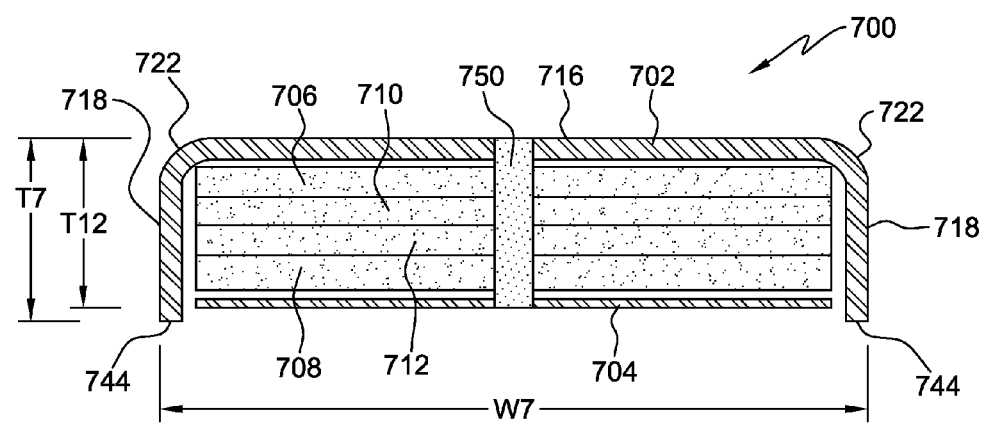
FIG. 6 is a side cross-sectional view of a sixth exemplary seal assembly.

FIG. 6 shows an exemplary alternative embodiment of a seal assembly generally indicated by reference numeral 700. Exemplary seal assembly 700 is similar to the exemplary seal assemblies described above and therefore like reference numerals preceded by the numeral "7", as opposed to "6", "5", "4", "3" or "2", are used to indicate like elements. The description above with respect to the other exemplary seal assemblies (including the descriptions imported from differing seal assemblies), including description regarding alternative embodiments (i.e., modifications, variations or the like), equally applies to exemplary seal assembly 700 (and any alternative embodiments of exemplary seal 700). As shown in FIG. 6, exemplary seal assembly 700 may include exemplary first and second outer shims 702, 704 and one or more exemplary shims or layers positioned between the first and second outer shims 702, 704, such as the shims and layers discussed herein with respect to other seal assembly embodiments. In some alternative embodiments, the seal assembly may not include any intermediate shims or filler layers.

As shown in the exemplary embodiment illustrated in FIG. 6, the exemplary first outer shim 702 of seal assembly 700 may include an exemplary medially positioned first portion 716 extending in the direction of the width W7 of the seal assembly 700 and exemplary second portions 718 extending from opposing sides of the first portion 716 towards the interior of the assembly 700 (i.e., in the direction of the thickness T7 of the seal assembly 700). As illustrated in FIG. 6, the transition or joint 722 between the first and second portions 716, 718 may include a rounded exterior corner of a small radius. As illustrated in FIG. 6, the second portions 718 of the first shim 702 may be substantially planar and oriented substantially normal to the first portion 716, which may also be substantially planar. In alternative embodiments, the exemplary first and second portions 716, 718 may not be planar, and the second portions 718 may be oriented with respect to the first portion 718 at orientations other than about 90 degrees.

The configuration of the second portions 718 of the first shim 702 may have several advantages. For example, the exemplary interior-extending second portions 718 may act to increase the strength of the seal assembly in a direction extending along the width W7 of the seal assembly 700 (as compared to if the second portions 718 did not extend in the direction of the thickness T7 of the seal assembly 700). As discussed above with respect to at least, exemplary seal assembly 200, strength (i.e., stiffness) along the width W7 of the seal assembly 700 may be advantageous during use and assembly.

The exemplary second exterior shim 704 may be positioned between the exemplary second portions 718 of the exemplary first outer shim 702, as shown in FIG. 6. In such a configuration, one or more shims or layers may be positioned between the second exterior shim 704, the first portion 716 of the first outer shim 702, and the second portions 718 of the first outer shim 702. Thereby, in such embodiments, the exemplary second portions 718 may advantageously provide a mechanism for aligning one or more interior shims or layers with themselves and the first and second shims 702, 704 (both during assembly and during use of the seal assembly 700). In the illustrated exemplary embodiment of FIG. 6, the exemplary seal assembly 700 includes exemplary first and second interior shims 706, 708 and exemplary first and second filler layers 810, 812 positioned between the exemplary second exterior shim 704 and the exemplary first portion 716 of the exemplary first outer shim 702 in the direction of the thickness T7 of the seal assembly and between the exemplary second portions 718 in the direction of the width W7 of the seal assembly 700. As also illustrated in FIG. 6, the first and second outer shims 702, 704, first and second interior shims 706, 708 and first and second filler layers 710, 712 may be are coupled to one another by at least one medial weld 750.

The exemplary seal assembly 700 may be configured (and/or installed) such that the "feet" or ends 744 of the second portions 718 of the first exterior shim 702 engage the sealing surfaces of the sealing slots of adjacent components when the seal assembly 700 is installed in the sealing slots of adjacent components. In such an embodiment, the combined thicknesses T12 of the second exterior shim 704 and any interior shims or layers in comparison to the thickness T7 of the first exterior shim 702 may be configured that the second exterior shim 704 also interacts with a sealing surface of at least one sealing slot of the components in which the seal assembly 700 is installed. In this way, in use the ends 744 of the second portions 718 may act as an initial seal and the second exterior shim 704 may act as a secondary seal. For example, the ends 744 of the second portions 718 may initially prevent or reduce some flow from leaking between the components in which the seal assembly 700 is installed, but some flow may infiltrate the interior of the seal assembly 700. For example, some flow may infiltrate the interior of the exemplary seal assembly 700 by flowing over an end of the first outer shim 702 (or the seal assembly 700 in general) in the length direction. As another example, some flow may infiltrate the interior of the seal assembly 700 if one or more of the ends 744 of the second portions 718 of the first exterior shim 702 (or any other part of the second exterior shim) become compromised, such as from wear. In some embodiments, the exemplary seal assembly 700 may include a filler layer that is porous, and such infiltration flow may penetrate the filler layer. In scenarios wherein flow has infiltrated the interior of the seal assembly 700, the exemplary seal assembly 700 may be configured such that the exemplary second exterior shim 704 may reduce or prevent the infiltrated flow from leaking between the components.

One end or foot 744 of the exemplary second portions 718 and second exterior shim 704 may also act in concert to prevent or reduce leakage between the components in which the seal assembly 700 is installed. For example, the exemplary seal assembly 100 may be installed in first and second sealing slots of first and second components, respectively, and the first and second components may become misaligned to such a degree that one of the ends 744 of the second portions 718 is not in sealing engagement within the first sealing slot of the first corresponding component. In such a scenario, however, the second exterior shim 704 may none-the-less be in sealing engagement with the first sealing slot. In this configuration, the end 744 of the second portion that has remained 718 in sealing engagement with the second seal slot and the second exterior shim 704 in sealing engagement with the first sealing slot can act in concert to prevent or reduce leakage between the first and second components.

In some alternative seal assembly 700 embodiments (not shown), the thickness T12 of the second exterior shim 704 and any interior shims or layers in comparison to the thickness T7 of the first exterior shim 702 may be configured that the second exterior shim 704 extends at least partially past the ends 744 of the second portions 718 of the first exterior shim. In such an embodiment, the interior shims or layers may be compressed in the thickness direction during use or installation (or both). For example, exemplary seal assembly 100 may be installed such that at least one interior shim or layer compresses during installation or use such that the ends 744 of the second portions 718 engage the sealing surfaces of the sealing slots of the components in which the seal assembly 700 is installed.

In some embodiments, the exemplary seal assembly 700 may be installed (and/or configured) such that the exterior surface of the second exterior shim 704 engages the sealing surfaces of the sealing slots of adjacent components when the seal assembly 700 is installed in sealing slots of adjacent components. In such arrangements, the high pressure flow may act on the first exterior shim 702 and force the exterior surface of the second exterior shim 704 and/or the ends 744 of the second portions 718 of the first exterior shim 702 into engagement with the sealing surfaces of the sealing slots of the components in which the seal assembly 700 is installed. In some other embodiments, the exemplary seal assembly 700 may be installed (and/or configured) such that high pressure flow acts on the second exterior shim 704 (and potentially ends 744 of the second portions 718 of the first exterior shim 702 and/or the interior surfaces of the first exterior shim 702) such that the exterior surface of the first exterior shim 702 sealingly engages the sealing slots of adjacent components when the seal assembly 700 is installed in sealing slots of adjacent components.

An advantage of the exemplary second portions 718 of the exemplary first shim 702 (in conjunction with the second shim 704 and any interior shims or layers) of exemplary seal assembly 700 shown in FIG. 6 is that the exemplary second portions 718 of the seal assembly 700 may provide protection to the sides of any interior shims or layers of the seal assembly 700. For example, in seal assembly embodiments including filler layers or shims including a cloth (such as the illustrated first and second filler layers 710, 712), the exemplary second portions 718 may wrap at least partially along the sides of the cloth. Thereby, the exemplary second portions 718 of the exemplary first shim 702 may prevent the cloth from damage, such as preventing the end portions of the cloth from fraying. Further, the configuration of the exemplary first and second shims 702, 704 may be relatively easy to manufacture and assemble (along with any other components of the seal assembly 700).

Figure 7:
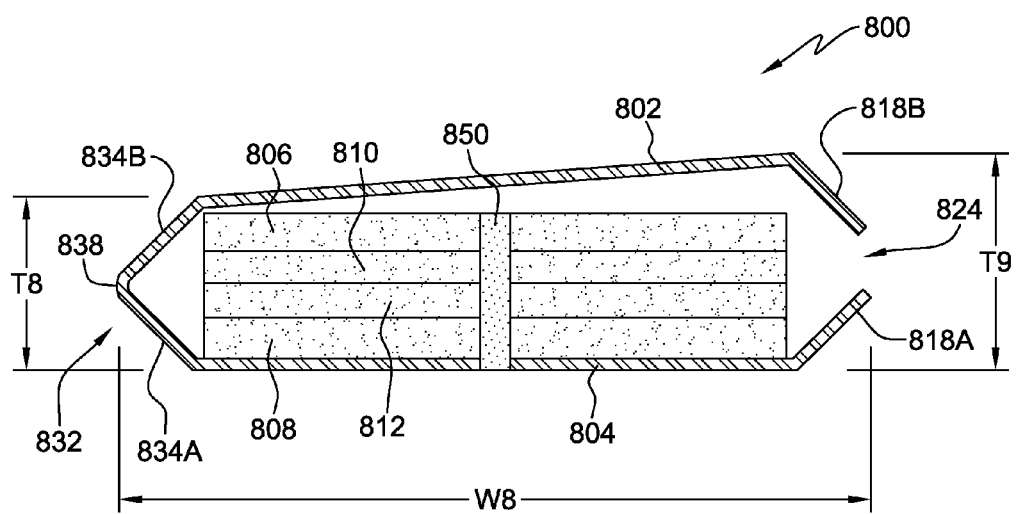
FIG. 7 is a side cross-sectional view of a seventh exemplary seal assembly.

FIG. 7 shows an exemplary alternative embodiment of a seal assembly generally indicated by reference numeral 800. Exemplary seal assembly 800 is similar to the exemplary seal assemblies described herein and therefore like reference numerals preceded by the numeral "8", as opposed to "7", "6", "5", "4", "3" or "2", are used to indicate like elements. The description above with respect to the other exemplary seal assemblies (including the descriptions imported from differing seal assemblies), including description regarding alternative embodiments (i.e., modifications, variations or the like), equally applies to exemplary seal assembly 800 (and any alternative embodiments of exemplary seal 800). As shown in FIG. 7, exemplary seal assembly 800 may include exemplary first and second outer shim portions 802, 804 and one or more shims or layers positioned between the first and second outer shim portions 802, 804, such as the shims and layers discussed herein with respect to other seal assembly embodiments.

As shown in FIG. 7, exemplary seal assembly 800 may include several outer shim portions that together form a "C" shape. Specifically, the exemplary seal assembly 800 may include exemplary first and second outer shim portions 802, 804, an exemplary first centering member 834A, an exemplary second centering member 834B, an exemplary third centering member 818A, and an exemplary centering member 818B, as illustrated in FIG. 7. The exemplary first and second outer shim portions 802, 804 may at least span the width of any internal shims or layers, such as first and second interior shims 806, 808 and first and second filler layers 810, 812.

At a first side of the width of the seal assembly 800, the exemplary first and second centering members 834A, 834B may extend from the exemplary first and second shim portions 802, 804, respectively, in a direction that extends away from a medial portion of the seal assembly 800 in the direction of the width W8 of the seal assembly 800, and may extend towards an internal portion of the seal assembly 800 in the direction of the thickness or height T8/T9 of the seal assembly 800. The first and second centering members 834A, 834B may extend from the first and second shim portions 802, 804, respectively until they converge. In such an embodiment, the junction of the first and second centering members 834A, 834B may form an apex or point 838 that defines the widest portion of the respective side of the seal assembly 800, as shown in FIG. 7. In some embodiments, the apex or point 838 is positioned in a medial portion of the thickness T8 of the first end of the sealing assembly 800. At the second side of the width of the seal assembly 800 (the side that opposes the first side thereof), the exemplary third and fourth centering members 818A, 818B may extend from the first and second shim portions 802, 804, respectively, in a direction that extends away from a medial portion of the seal assembly 800 in the direction of the width W8 of the seal assembly 800, and may extend towards an internal portion of the seal assembly 800 in the direction of the thickness or height T8/T9 of the seal assembly 800. As noted above with respect to exemplary seal assemblies 400 and 500, the orientation of the exemplary first and centering members 834A, 834B at the first side of the seal assembly 800 and the orientation of the exemplary third and fourth centering members 818A, 818B at the second side of the seal assembly 800 may assist in the insertion of the first and second sides of the seal assembly 800 into corresponding seal slots.

In the illustrated embodiment, the sealing assembly 800 is configured such that the thickness or height of the exemplary first side T8 is less than the thickness or height of the first side T9. Stated differently, the exemplary illustrated seal assembly 800 is configured such that the spacing between the first and second shim portions 802, 804 in the direction of the thickness or height T8/T9 of the seal assembly 800 increases from the first side (thickness T8) to the second side (thickness T9). As also shown in FIG. 7, although the exemplary third and fourth centering members 818A, 818B of exemplary seal assembly 800 may extend from the first and second shim portions 802, 804, respectively, toward one another, the third and fourth centering members 818A, 818B may not converge. Thereby, in such exemplary configurations, the third and fourth centering members 818A, 818B may form a gap or spacing 824 therebetween. Further, any internal shims or layers may be coupled to only one of the first and second shim portions 802, 804, and the shims or layers may be configured such that the non-coupled shim portion of the first and second shim positions 802, 804 is capable of flexing in at least the thickness T8/T9 direction of the seal assembly 800, as shown in FIG. 7.

In the illustrated exemplary seal assembly 800 of FIG. 7, the first and second interior shims 806, 808 and first and second filler layers 810, 812 are attached only to the second shim portion 804 by one or more medial welds 950. Further, the exemplary first and second interior shims 806, 808 and first and second filler layers 810, 812 of seal assembly 800 are configured such that the first shim portion 802 is capable of flexing at least in the thickness T8/T9 direction. As such, the exemplary gap or spacing 824 between the third and fourth centering members 818A, 818B is a variable gap which can vary depending upon the position of the first shim portion 802.

In use, the exemplary third and fourth centering members 818A, 818B of the second side of the seal assembly 800 may assist in the insertion of the seal assembly 800 into in a first slot of a component. As the thickness or height T9 of the second end is relatively large, the first shim portion 802 may be forced to flex inwardly such that after insertion the forces applied to the interior of the first slot by the first shim portion 802 holds the seal assembly 800 within the first seal slot. For example, the thickness or height T9 of the second end may be greater than slot thickness. In some such embodiments, the thickness or height T8 of the first end may be less than the slot thickness. Any interior shims or layers, such as interior filler layers 810, 812, may be flexible and apply damping forces to the first seal assembly 800 both during insertion into the first slot of the first component and during operation (i.e., during active sealing scenarios). Thereby, the seal assembly 800 can be placed into the first slot without the use of glue or any other attachment means and will be firmly held within the slot while a second seal slot of another component is moved into engagement with the first side of the seal assembly 800. The first and second centering members 834A, 834B of the first side of the seal assembly 800 may assist in the insertion of the seal assembly 800 into the second seal slot of the other component. Similarly, the relatively small thickness or height T8 of the first side of the seal assembly 800 may assist in the insertion of the seal assembly 800 into the second seal slot of the other component.

After being installed within the first and second slots of the two components, the positive retention of the exemplary seal assembly 800 in the first seal slot of the first component may act to force at least one of the first and second shim portions 802, 804 against the walls of the first and second sealing slots and, thereby, maintain the sealing of any gap between the first and second components during operation. Also during operation, the gap or spacing 824 between the third and fourth centering members 818A, 818B may allow, at least in part, for high pressure flow (e.g., fluid, gases, etc.) to flow into the interior of the seal assembly 800 and act on the interior surface of whichever of the first and second shim portions 802, 804 is in sealing engagement with the seal slots of the components. For example, the seal assembly 800 may include exemplary first and second filler layers 810, 812, and the first and second filler layers 810, 812 may include porous cloth that allows high pressure flow to flow through the cloth, at least partially, and act on the interior surface of whichever of the first and second shim portions 802, 804 is in sealing engagement with the seal slots of the components. In some such embodiments, the porous first and second filler layers 810, 812 may act to reduce the high pressure flow that acts on the interior surface of whichever of the first and second shim portions 802, 804 is in sealing engagement with the seal slots of the components. In some embodiments, the seal assembly 800 includes apertures or other passageways other than gap 824 for directing high pressure flow into the interior of the seal assembly 800.

Figure 8:
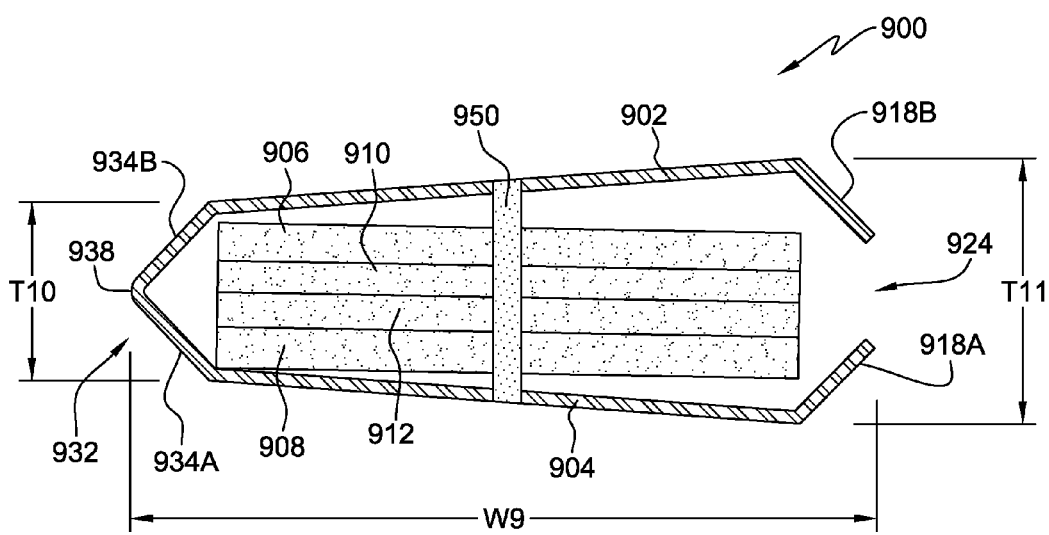
FIG. 8 is a side cross-sectional view of an eighth exemplary seal assembly.

FIG. 8 shows an exemplary alternative embodiment of a seal assembly generally indicated by reference numeral 900. Exemplary seal assembly 900 is substantially similar to the exemplary seal assembly 800 described above with respect to FIG. 7, and therefore like reference numerals preceded by the numeral "9", as opposed to "8", are used to indicate like elements. The description above with respect to seal assembly 800 (including the descriptions imported from differing seal assemblies), including description regarding alternative embodiments (i.e., modifications, variations or the like), equally applies to exemplary seal assembly 900 (and any alternative embodiments of exemplary seal 900).

One difference between exemplary seal assembly 900 of FIG. 8 and exemplary seal assembly 800 of FIG. 7 is the interior shims or layers are coupled to one another and both the first and second outer shim portions 902, 904. More specifically, as shown in FIG. 8, the exemplary seal assembly 900 includes exemplary first and second outer shim portions 902, 904, exemplary first and second interior shims 906, 908 and exemplary first and second filler layers 910, 912 coupled to each other via at least one exemplary medial weld 950. As a result, the exemplary seal assembly 900 may be easier to manufacture than exemplary seal assembly 800.

Another difference between exemplary seal assembly 900 and exemplary seal assembly 800 is the flexibility of the exemplary first and second outer shim portions 902, 904. As shown in FIG. 8, the exemplary interior shims or layers may be configured such that both the exemplary first and second outer shim portions 902, 904 are freely flexible in the thickness T10/T11 direction, but only past the exemplary medial weld 950. Thus, the portions of the first and second shim portions 902, 904 on the side of the weld 950 adjacent the third and fourth centering members 918A, 918B may be more flexible than the portions of the first and second shim portions 902, 904 on the side of the weld 950 adjacent the first and second centering members 934A, 934B. Further, the exemplary seal assembly 900 may provide more flexibility than the exemplary seal assembly 800.

The seal assemblies disclosed herein (e.g., seal assemblies 200, 300, 400, 500, 600, 700, 800, 900 and alternative embodiments thereof) provide low leakage rate similar to that possible with solid metal shim seals (thin or thick) while eliminating the manufacturing, assembly, and robustness concerns when applied to turbomachinery. Moreover, the seal assemblies disclosed herein may be less susceptible to manufacturing variations as compared to existing cloth seals. The seal assemblies disclosed herein thus reduce leakage with low manufacturing and operational risks, and are applicable in both OEM and retrofit applications.

It is to be understood that the above description is intended to be illustrative, and not restrictive. Numerous changes and modifications may be made herein by one of ordinary skill in the art without departing from the general spirit and scope of the invention as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Also, the term "operably connected" is used herein to refer to both connections resulting from separate, distinct components being directly or indirectly coupled and components being integrally formed (i.e., monolithic). Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A seal assembly for sealing a gap between adjacent turbomachinery components, the assembly including:
   a first outer shim; and
   a second outer shim;
   wherein the first and second outer shim are operably coupled;
   wherein at least one of the first and second outer shims includes at least one substantially impervious portion configured to span across the gap and engage each of the adjacent turbomachinery components to substantially seal the gap therebetween;
   wherein the seal assembly includes at least first and second filler layers;
   wherein the first and second filler layers are operably coupled to the first and second outer shims by at least two welds; and
   wherein the at least two welds include a first weld that directly couples the at least two filler layers to one another, and a second weld that is weaker than the first weld that directly couples the first outer shim and the first filler layer and directly couples the second outer shim and the second filler layer.

2. The seal assembly of claim 1, wherein each of the first and second outer shims include at least one substantially impervious portion configured to span across the gap and engage each of the adjacent turbomachinery components to substantially seal the gap.

3. The seal assembly of claim 1, wherein the seal assembly includes at least one of an inner shim and a filler layer positioned between the first and second outer shims.

4. The seal assembly of claim 3, wherein the seal assembly includes at least one inner shim, and wherein the at least one inner shim is substantially solid.

5. The seal assembly of claim 4, wherein the seal assembly includes at least one filler layer, and wherein the at least one filler layer is as flexible as or less flexible than at least one of the first and second shims.

6. The seal assembly of claim 4, wherein the at least one filler layer is more porous than at least one of the first and second shims.

7. The seal assembly of claim 6, wherein the at least one filler layer includes at least one of a wire mesh woven cloth, a flat ribbon mesh woven cloth, a honeycomb structure, a corrugated shim and a compliant shim.

8. The seal assembly of claim 6, wherein the seal assembly includes at least one inner shim positioned between the at least one filler layer and the first outer shim, and wherein the at least one inner shim is less porous than the at least one filler layer.

9. The seal assembly of claim 8, wherein the seal assembly includes:
   a first inner shim adjacent a first filler layer, the first inner shim being positioned between the first outer shim and the first filler layer; and
   a second inner shim adjacent a second filler layer, the second inner shim being positioned between the second outer shim and the second filler layer.

10. The seal assembly of claim 6, wherein the seal assembly includes at least one inner shim positioned between at least two filler layers, and wherein the at least one inner shim is adjacent at least one of the at least two filler layers.

11. The seal assembly of claim 3, wherein the seal assembly defines a width and a thickness defining an interior of the seal assembly, wherein the first and second outer shims extend at least along the width of the seal assembly, and wherein the seal assembly includes first and second members operably connected to opposing sides of the first outer shim and extend therefrom at least along the thickness of the seal assembly in a direction towards the interior of the seal assembly.

12. The seal assembly of claim 11, wherein the second outer shim and the at least one of an inner shim and a filler layer are positioned between the first and second members, and wherein the thickness of the first and second members is greater than the combined thickness of the second outer shim and the at least one of an inner shim and a filler layer.

13. The seal assembly of claim 11, wherein the seal assembly includes third and fourth members operably connected to opposing sides of the second outer shim that extend therefrom along the thickness of the seal assembly towards the interior of the seal assembly.

14. The seal assembly of claim 13, wherein at least a portion of the first outer shim is oriented substantially perpendicular to at least one of the first and second members, and wherein at least a portion of the second outer shim is oriented substantially perpendicular to at least one of the third and fourth members.

15. The seal assembly of claim 13, wherein at least one of the first and second members also extend along the width of the seal assembly away from the interior of the seal assembly, and wherein at least one of the third and fourth members also extend along the width of the seal assembly away from the interior of the seal assembly.

16. The seal assembly of claim 15, wherein the first, second, third and fourth members also extend along the width of the seal assembly away from the interior of the seal assembly, wherein the first member and the third member are positioned on a first side of the seal assembly and the second member and the fourth member are positioned on a second side of the seal assembly, wherein the first and third members are operably connected to form an apex, and wherein the second and fourth members are spaced at least along the thickness of the seal assembly.

17. The seal assembly of claim 16, wherein at least the first outer shim and the at least one of an inner shim and a filler layer are operably coupled by at least one weld positioned in a medial portion of the width of the seal assembly.

18. The seal assembly of claim 17, wherein at least the second outer shim, first outer shim and the at least one of an inner shim and a filler layer are operably coupled by at least one weld positioned in a medial portion of the width of the seal assembly.

19. The seal assembly of claim 3, wherein the seal assembly defines a width and a thickness, wherein the first and second outer shims extend at least along the width of the seal assembly, wherein the seal assembly includes a first member operably connected to a first width side of the first outer shim and a second member operably connected to a second width side of the second outer shim, and wherein the first and second shims are oriented such that the first width side of the first outer shim and the second width side of the second outer shim are positioned at opposing width sides of the seal assembly.

20. The seal assembly of claim 19, wherein the first member extends from the first outer shim at least along the thickness of the seal assembly in a direction towards the interior of the seal assembly and along the width of the seal assembly away from the interior of the seal assembly; and wherein the second member extends from the second outer shim at least along the thickness of the seal assembly in a direction towards the interior of the seal assembly and along the along the width of the seal assembly away from the interior of the seal assembly.

21. The seal assembly of claim 20, wherein the seal assembly includes a third member operably coupled to the first member and a fourth member operably coupled to the second member, wherein the third member extends from the first member at least along the thickness of the seal assembly in a direction towards the second outer shim and along, the width of the seal assembly towards the interior of the seal assembly to form a first apex with the first member at a first side of the seal assembly, and wherein the fourth member extends from the second member at least along the thickness of the seal assembly in a direction towards the first outer shim and along, the width of the seal assembly towards the interior of the seal assembly to form a second apex with the first member at a second side of the seal assembly.

22. The seal assembly of claim 3, wherein the seal assembly defines a width and thickness, and wherein the first outer shim, the second outer shim and the at least one of an inner shim and a filler layer are operably coupled by at least one weld or braze extending generally along the thickness of the seal assembly in a medial portion of the width of the seal assembly.

23. A seal assembly for sealing a gap between adjacent turbomachinery components, the assembly including:
   a first outer shim;
   a second outer shim; and
   at least one of an inner shim and a filler layer positioned between the first and second outer shims,
   wherein the at least one of an inner shim and a filler layer is operably coupled to the first and second outer shims,
   wherein the first and second outer shim are operably coupled,
   wherein at least one of the first and second outer shims includes at least one substantially impervious portion configured to span across the gap and engage each of the adjacent turbomachinery components to substantially seal the gap therebetween,
   wherein the seal assembly defines a width and thickness, and wherein the first outer shim, the second outer shim and the at least one of an inner shim and a filler layer are operably coupled by at least one weld or braze extending generally along the thickness of the seal assembly in a medial portion of the width of the seal assembly;
   wherein the seal assembly includes at least first and second woven cloth filler layers, wherein the first and second woven cloth filler layers are operably coupled to the first and second outer shims by at least two welds, and wherein the at least two welds include a first weld that directly couples the at least two woven cloth filler layers to one another, and a second weld that is weaker than the first weld that directly couples the first outer shim and first woven cloth filler layer and directly couples the second outer shim and second woven cloth filler layer.

* * * * *